United States Patent
Chen

(10) Patent No.: US 6,305,869 B1
(45) Date of Patent: Oct. 23, 2001

(54) TUBE TIGHTENING STRUCTURE FOR COLLAPSIBLE VEHICLES

(75) Inventor: Ting-Hsing Chen, Tainan Hsien (TW)

(73) Assignee: Far Great Plastics Industrial Co., Ltd., Tainan Hsien (TW)

(*) Notice: Subject to any disclaimer, the term of this patent is extended or adjusted under 35 U.S.C. 154(b) by 0 days.

(21) Appl. No.: 09/534,624

(22) Filed: Mar. 27, 2000

(51) Int. Cl.⁷ .................................................. E02B 7/02
(52) U.S. Cl. ........................ 403/109.5; 403/DIG. 4; 403/104; 280/87.041; 280/87.05
(58) Field of Search .................... 403/DIG. 4, 109.5, 403/104, 109.1, 377, 373, 374.2, 374.5, 322.4; 280/87.021, 87.041, 87.05, 283, 275, 220

(56) References Cited

U.S. PATENT DOCUMENTS

| | | | |
|---|---|---|---|
| 4,528,768 | * | 7/1985 | Anderson ............................. 403/104 |
| 5,279,181 | * | 1/1994 | Boudreau ............................ 403/104 |
| 6,079,724 | * | 6/2000 | Lin ................................... 280/87.041 |
| 6,142,699 | * | 11/2000 | Pao ................................... 403/109.5 |
| 6,158,751 | * | 12/2000 | Wu et al. ........................ 280/87.041 |

FOREIGN PATENT DOCUMENTS

4019739-A1 * 2/1991 (DE).

* cited by examiner

Primary Examiner—Lynne H. Browne
Assistant Examiner—Aaron Dunwoody
(74) Attorney, Agent, or Firm—Rosenberg, Klein & Lee

(57) ABSTRACT

A tube tightening structure for collapsible vehicles includes a tube tightening member provided with a handy wrench and being disposed at an end portion of a main tubular element of a telescopic tube body. An auxiliary tubular element is fitted into the main tubular element. The main tubular element is provided with a groove along an axial direction at one end where the auxiliary tubular element is fitted into the main tubular element. The tube tightening member is disposed at the groove, and has a securing bolt threadedly provided thereon to abut against the wall of the main tubular element. The auxiliary tubular element has a lower section formed with a recessed groove along a direction corresponding to the direction of the groove of the main tubular element such that a lower end of the recessed groove is a distance away from a lower end of the auxiliary tubular element. A positioning element is secured between open ends of the tube tightening member by means of a pivot pin pivotally connected to the handy wrench. The positioning element has one end forming a tapered abutting block that is oriented towards the inner side of the groove of the main tubular element, with the other end forming an abutting plate abutting against the open ends of the tube tightening member. The abutting block abuts against the recessed groove of the auxiliary tubular element in a matching configuration, such that telescopic movement of the tubular elements is facilitated, and relative turning of the tubular elements is prevented.

1 Claim, 6 Drawing Sheets

TUBE TIGHTENING STRUCTURE FOR COLLAPSIBLE VEHICLES

BACKGROUND OF THE INVENTION (a) Field of the Invention

The present invention relates to a tube tightening structure for collapsible vehicles, more particularly to a tube tightening structure that has a handy wrench and a positioning element to prevent turning of telescopic tubular elements during length adjustment.

(b) Description of the Prior Art

Many articles are provided with a collapsible structure to enable them to be compact so as to facilitate carrying, storage, or transport. Telescopic structures are therefore commonly used, for instance, in length adjustable tubular members. One very common instance is collapsible bicycle, in which telescopic structures are provided on the longer and higher fame tubes to enable the collapsible bicycle to be very compact suitable for carrying and storage. In order to secure telescopic structures in a speedy manner, a tube tightening member having a handy wrench is often used. With reference to FIGS. 5 and 6, the end portion of an outer tube A of a telescopic tube is provided with a groove A1 along an axial direction, and is fitted with a tube tightening element C having a handy wrench C1. The annular inner side of the tube tightening element C is formed with a projecting strip C2 that extends relative to the groove A1 inside the tube. An inner tube B is formed with a punched V-shaped longitudinally oriented recessed groove B1 that corresponds to the strip C2 on the inner side of the tube tightening element C. A lower section of the recessed groove B1 is provided with an abutting post B2 that projects therefrom. By means of the above construction, the inner tube B may utilize the recessed groove B1 to slidably displace along the strip C2 on the inner side of the tube tightening element C in a telescopic manner and abut thereagainst to prevent turning. Besides, the abutting posts B2 is provided to abut against the strip C2 on the inner side of the tube tightening element C to constitute a stop function.

In the above-mentioned prior art structure, the strip on the annular inner side of the tube tightening element has to be separately formed and processed. As the construction of the tube tightening element is complicated and has a particular configuration, its adaptability is poor. Besides, since the strip abuts against the recessed groove, scratches may easily occur. Further, the abutting post on the lower section of the recessed groove is inserted into a separately formed hole, the processing of the wall of the recessed groove and the securing of the abutting post are time-consuming. Improvements thereon are therefore necessary.

SUMMARY OF THE INVENTION

A primary object of the present invention is to provide a tube tightening structure for collapsible vehicles that includes a tube tightening member provided with a handy wrench and a positioning element for mounting on a main tubular element of a telescopic tube so that an auxiliary tubular element inside the main tubular element is prevented from relative tuning and can be positioned conveniently.

According to the present invention, a tube tightening structure for collapsible vehicles includes a tube tightening member provided with a handy wrench and being disposed at an end portion of a main tubular element of a telescopic tube body. An auxiliary tubular element is fitted into the main tubular element. The main tubular element is provided with a groove along an axial direction at one end where the auxiliary tubular element is fitted into the main tubular element. The tube tightening member is disposed at the groove, and has a securing bolt threadedly provided thereon to abut against the wall of the main tubular element. The auxiliary tubular element has a lower section formed with a recessed groove along a direction corresponding to the direction of the groove of the main tubular element such that a lower end of the recessed groove is a distance away from a lower end of the auxiliary tubular element. A positioning element is secured between open ends of the tube tightening member by means of a pivot pin pivotally connected to the handy wrench. The positioning element has one end forming a tapered abutting block that is oriented towards the inner side of the groove of the main tubular element, with the other end forming an abutting plate abutting against the open ends of the tube tightening member. The abutting block abuts against the recessed groove of the auxiliary tubular element in a matching configuration, such that telescopic movement of the tubular elements is facilitated, and relative turning of the tubular elements is prevented.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
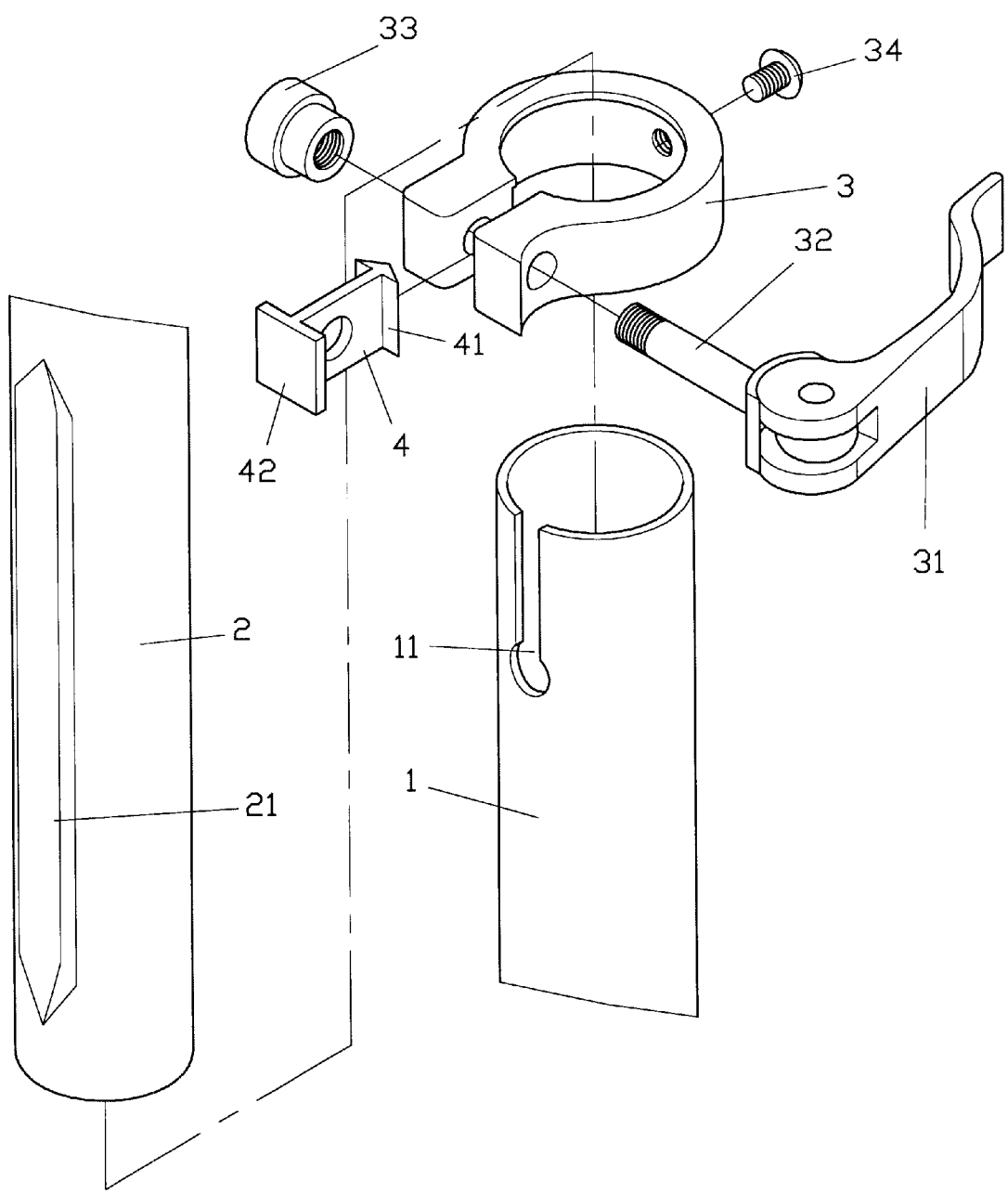
FIG. 1 is a schematic view of the structure of the present invention.
Figure 2:
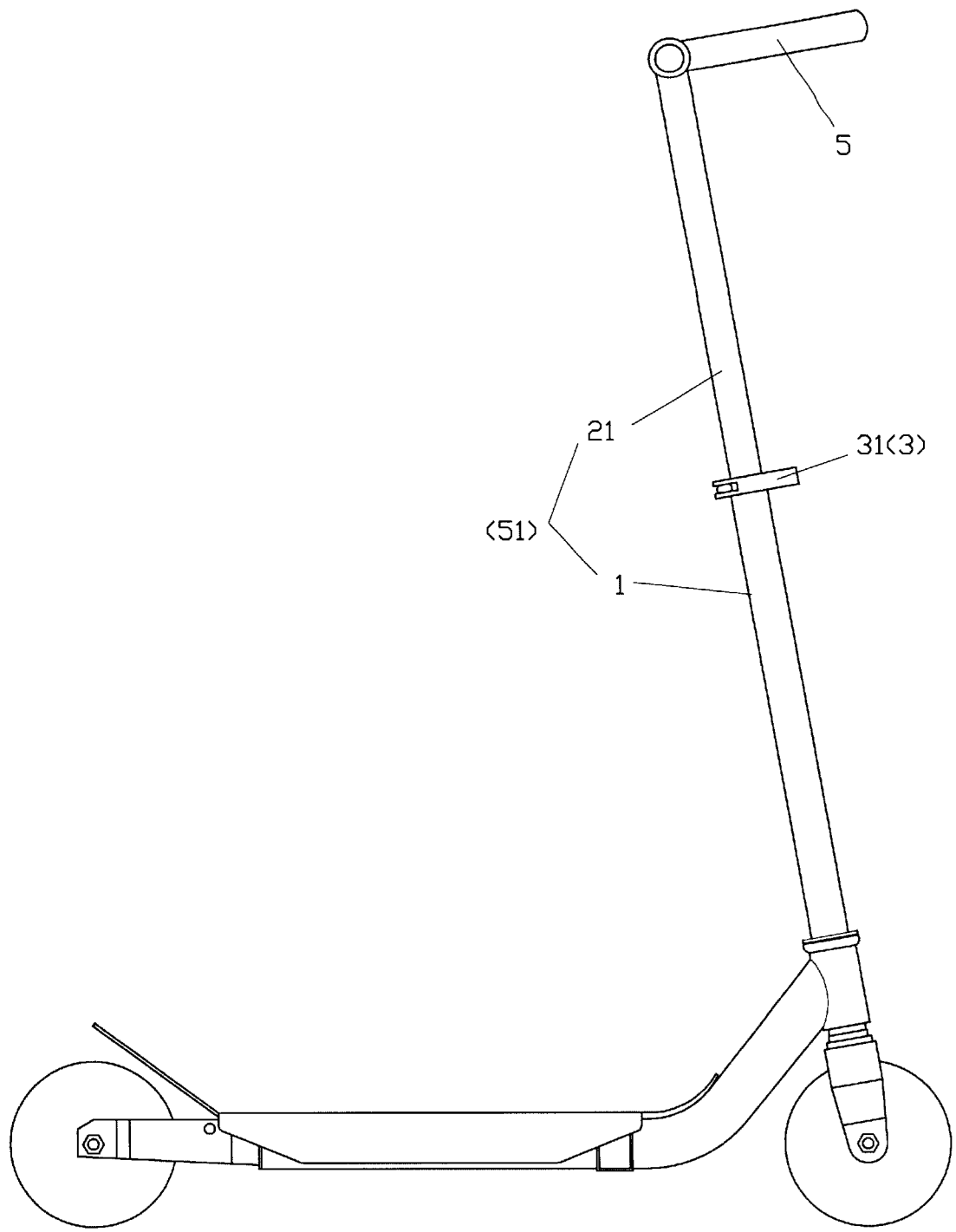
FIG. 2 is a schematic view illustrating the present invention applied to a skateboard cart.

As shown in FIGS. 1 and 2, a preferred embodiment of the present invention includes inter-engageable main and auxiliary tubular elements 1, 2, and a tube tightening member 3 having a handy wrench 31.

The main tubular element 1 is provided with a groove 11 along an axial direction at one end into which the auxiliary tubular element 2 is inserted, and is fitted with the tube tightening member 3 having the handy wrench 31.

The auxiliary tubular element 2 is fitted into the main tubular element 1, and has a lower section formed with a punched V-shaped longitudinally oriented recessed groove 21 corresponding to the direction of the groove 11 such that a lower end of the recessed groove 21 is a distance away from the end of the auxiliary tubular element 2.

The tube tightening member 3 has a positioning element 4 secured between open ends thereof by means of a pivot pin 32 pivotally connected to the handy wrench 31. An end portion of the positioning element that is oriented to the inner side of the groove 11 of the main tubular element is formed to have a tapered abutting block 41, with an abutting plate 42 provided at the other end to abut against the open end of the tube tightening member 3. A nut 33 is used to lock the free end of the pivot pin 32 of the handy wrench 31. A securing bolt 34 is further inserted into the tube tightening member 3.

Figure 3:
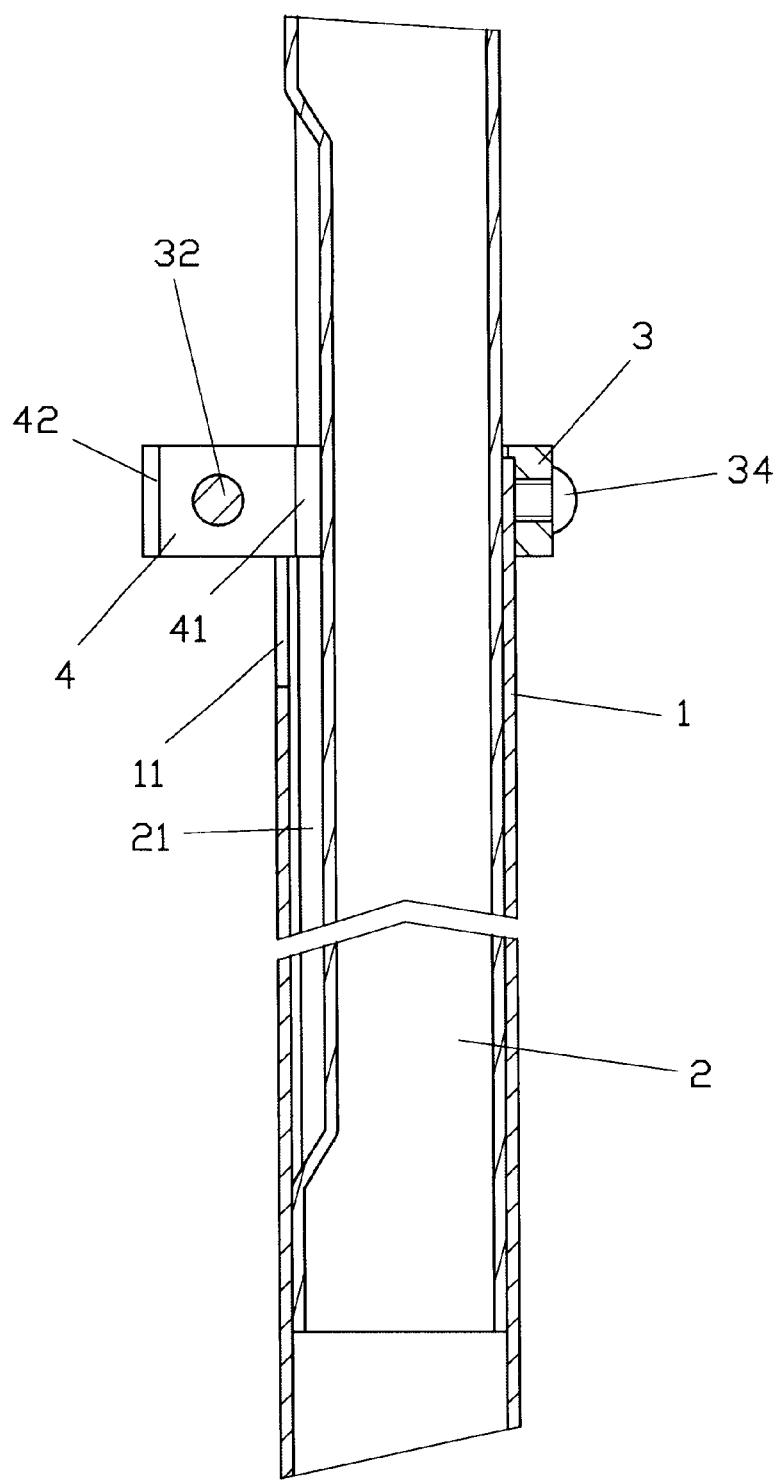
FIG. 3 is an assembled sectional view of the present invention.
Figure 4:
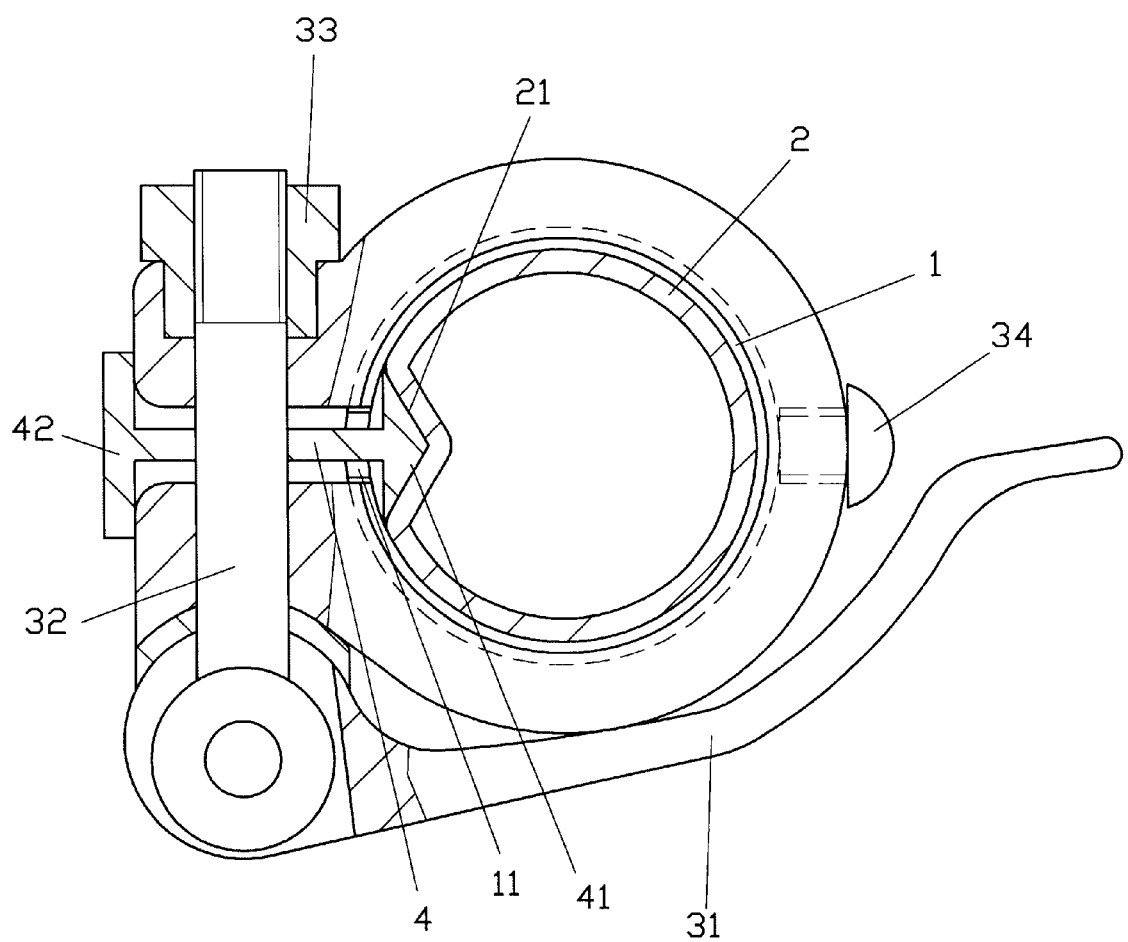
FIG. 4 is another assembled sectional view of the present invention.
Figure 5:
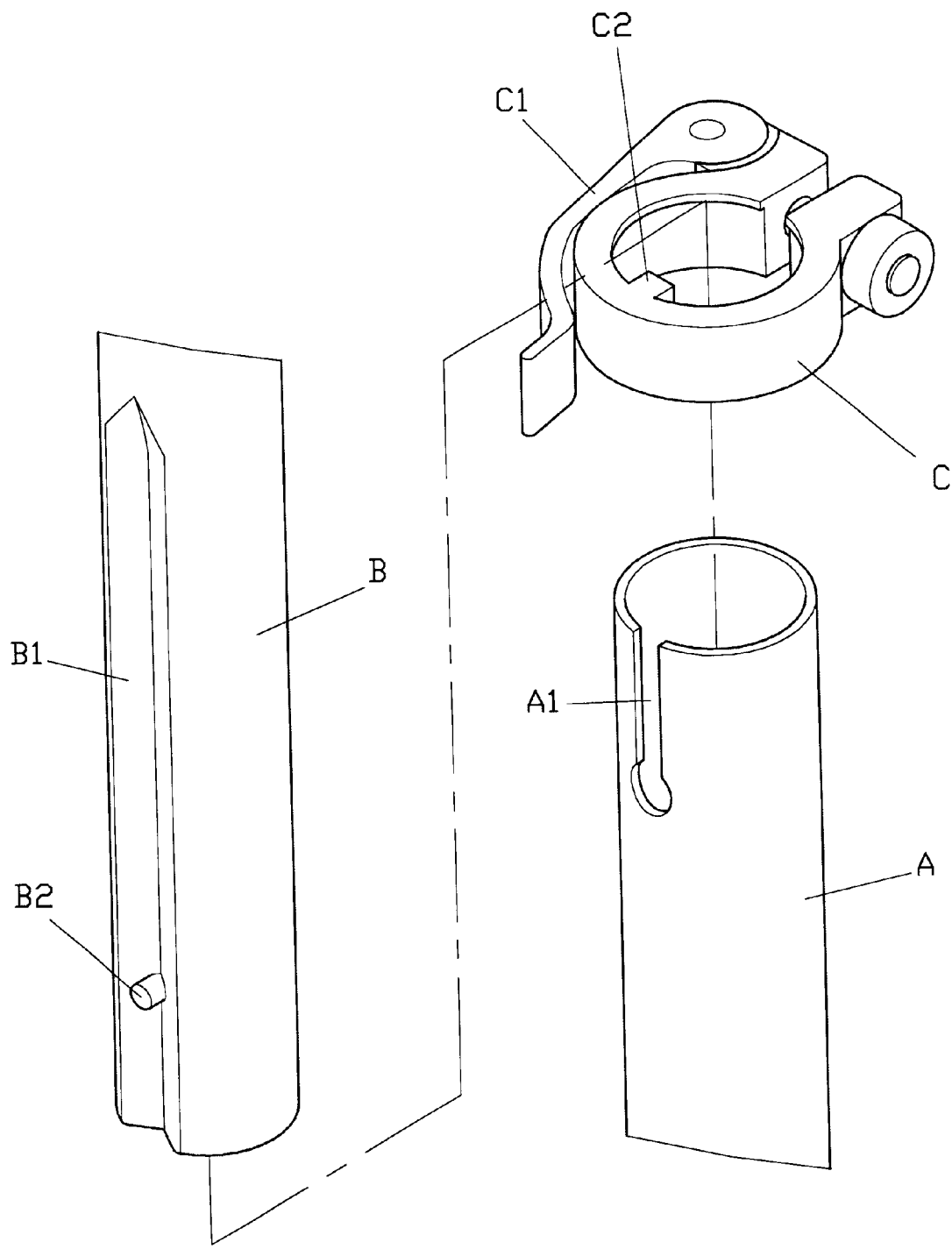
FIG. 5 is a schematic view of the prior art.
Figure 6:
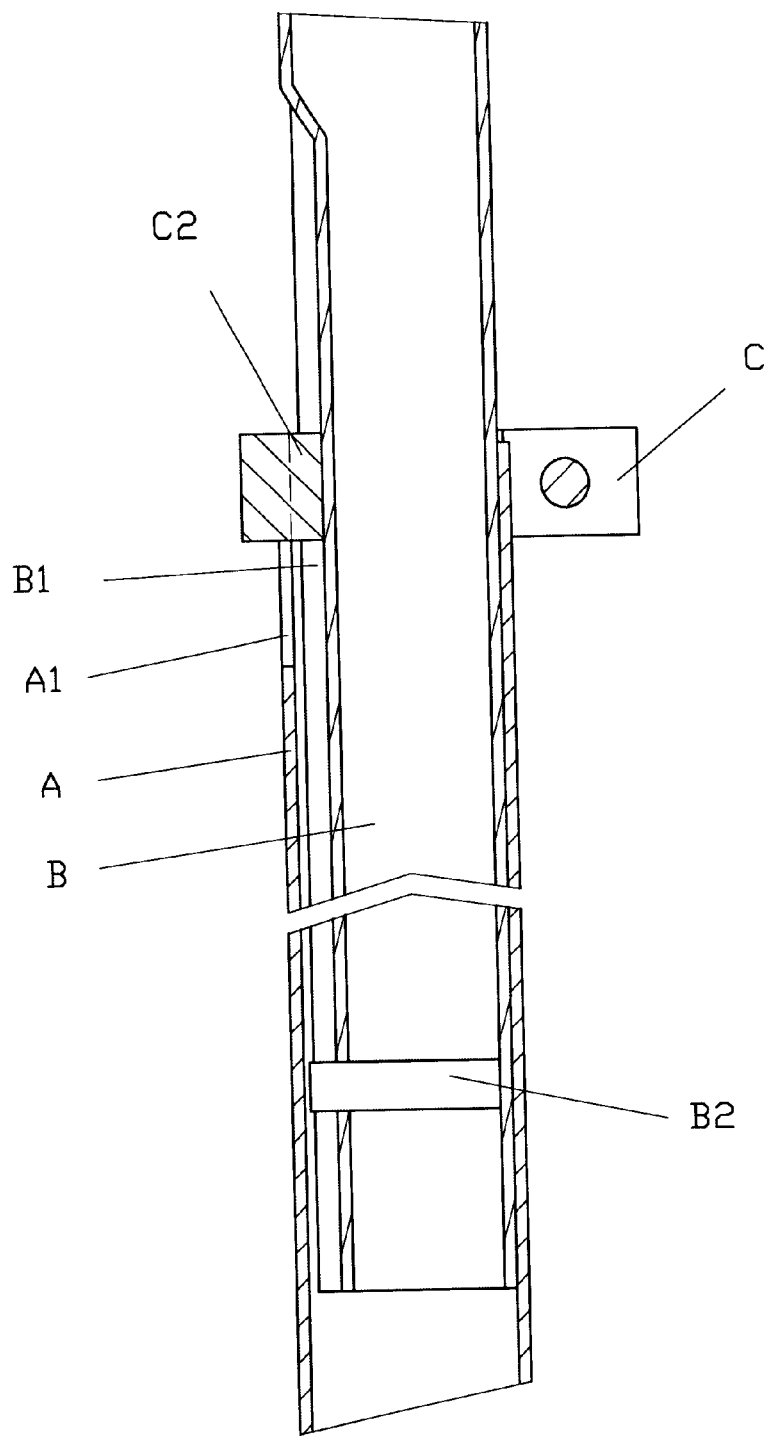
FIG. 6 is an assembled sectional view of the prior art.

With reference to FIG. 2, when the present invention is adapted for use, for instance, on an upright tube 51 of a handle of a skateboard cart, the main and auxiliary tubular elements 1, 2 form the two sections of the upright tube 51 to enable the upright tube 51 to be length adjustable. With reference to FIGS. 3 and 4, the tube tightening member 3 is fitted to the end portion of the main tubular element 1, with the securing bolt 34 is used to abut against the wall thereof for positioning and securing purposes. The positioning element 4 having the pivot pin 32 of the handy wrench 31 passing therethrough has the abutting block 41 extending into the groove 11 such that the pointed end of the abutting block 41 abuts against the V-shaped recessed groove 21 of the auxiliary tubular element 2 fitted into the main tubular element 1 to prevent relative turning of the main and auxiliary tubular elements 1, 2 to thereby facilitate telescopic movement thereof Furthermore, the handy wrench 31 enables the tube tightening member 3 to tighten the main tubular element 1 relative to the auxiliary tubular element 2, and can be quickly released to loosen the hold on the main tubular element 1 so that the auxiliary tubular element 2 can be pulled out to a longest length. The abutting block 41 of the positioning element 4 may also abut against the end of the recessed groove 21 of the auxiliary tubular element 2 to prevent disengagement of the auxiliary tubular element 2.

In sum, the tube tightening structure for collapsible vehicles provided with the specially designed positioning element is simple in construction and convenient to use, and has greater applicability.

Although the present invention has been illustrated and described with reference to the preferred embodiment thereof, it should be understood that it is in no way limited to the details of such embodiment but is capable of numerous modifications within the scope of the appended claims.

What is claimed is:

1. A tube tightening structure for collapsible vehicles, comprising a tube tightening member provided with a hand wrench and being disposed at an end portion of a main tubular element of a telescopic tube body, an auxiliary tubular element being fitted into the main tubular element, the main tubular element being provided with a groove along an axial direction at one end where the auxiliary tubular element is fitted into the main tubular element, said tube tightening member being disposed at the groove, said tube tightening member further having a securing bolt threadedly provided thereon to abut against the wall of the main tubular element, the auxiliary tubular element having a lower section formed with a recessed groove along a direction corresponding to the direction of the groove of the main tubular element such that a lower end of the recessed groove is a distance away from a lower end of the auxiliary tubular element, wherein a positioning element is secured between open ends of said tube tightening member by means of a pivot pin pivotally connected to said hand wrench, said positioning element having one end forming a tapered abutting block that is oriented towards the inner side of the groove of the main tubular element, with the other end forming an abutting plate abutting against said open ends of said tube tightening member, said abutting block abutting against the recessed groove of the auxiliary tubular element in a matching configuration.

* * * * *